(12) United States Patent
Yamanaka et al.

(10) Patent No.: US 10,608,233 B2
(45) Date of Patent: Mar. 31, 2020

(54) METHOD OF MANUFACTURING SECONDARY BATTERY

(71) Applicant: Sanyo Electric Co., Ltd., Daito-shi, Osaka (JP)

(72) Inventors: Tomokazu Yamanaka, Hyogo (JP); Kuroudo Hayakawa, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 309 days.

(21) Appl. No.: 15/814,627

(22) Filed: Nov. 16, 2017

(65) Prior Publication Data

US 2018/0183032 A1 Jun. 28, 2018

(30) Foreign Application Priority Data

Dec. 26, 2016 (JP) .................. 2016-250322

(51) Int. Cl.
*H01M 2/26* (2006.01)
*H01M 4/04* (2006.01)
(Continued)

(52) U.S. Cl.
CPC ............. *H01M 2/26* (2013.01); *B23K 11/002* (2013.01); *B23K 11/115* (2013.01); *B23K 11/34* (2013.01);
(Continued)

(58) Field of Classification Search
CPC ........ H01M 2/26; H01M 2/263; H01M 4/043; H01M 4/0471; H01M 10/0431;
(Continued)

(56) References Cited

U.S. PATENT DOCUMENTS

| 7,943,253 B2* | 5/2011 | Inagaki | ................... | H01M 2/22 29/623.1 |
| 2009/0004561 A1* | 1/2009 | Nansaka | ............... | H01M 2/263 429/185 |

(Continued)

FOREIGN PATENT DOCUMENTS

| JP | 2009-32640 A | 2/2009 |
| JP | 2009-259697 A | 11/2009 |

(Continued)

*Primary Examiner* — Jeremy Carroll
(74) *Attorney, Agent, or Firm* — Westermann, Hattori, Daniels & Adrian, LLP (57) ABSTRACT

A method of manufacturing a secondary battery including a negative electrode collector connected to a layered negative electrode core body exposed portion by welding, the method including a first step of disposing a core body connection of the negative electrode collector on an outer surface side of a layered negative electrode core body exposed portion so that a recess in the core body connection opposes the layered negative electrode core body exposed portion, a second step of pressing, with a pressing member, a portion in the core body connection where the recess is formed, forming a deformed portion, and contacting the deformed portion to the layered negative electrode core body exposed portion, and a third step of abutting an electrode for resistance welding against the negative electrode collector and resistance welding the negative electrode collector and the layered negative electrode core body exposed portion to each other.

7 Claims, 8 Drawing Sheets (51) Int. Cl.
  *B23K 11/34* (2006.01)
  *B23K 11/11* (2006.01)
  *H01M 10/0587* (2010.01)
  *H01M 10/04* (2006.01)
  *B23K 103/10* (2006.01)
  *B23K 101/36* (2006.01)
  *B23K 11/00* (2006.01)
  *H01M 10/052* (2010.01)

(52) U.S. Cl.
  CPC ........... *H01M 2/263* (2013.01); *H01M 4/043* (2013.01); *H01M 4/0471* (2013.01); *H01M 10/0431* (2013.01); *H01M 10/052* (2013.01); *H01M 10/0587* (2013.01); *B23K 2101/36* (2018.08); *B23K 2103/10* (2018.08)

(58) Field of Classification Search
  CPC ........... H01M 10/052; H01M 10/0587; B23K 11/002; B23K 11/115; B23K 11/34; B23K 2103/10; B23K 2102/36
  See application file for complete search history.

(56) References Cited

U.S. PATENT DOCUMENTS

| | | | | |
|---|---|---|---|---|
| 2009/0087736 | A1* | 4/2009 | Taniguchi | H01M 2/263 |
| | | | | 429/185 |
| 2010/0287763 | A1* | 11/2010 | Tsuchiya | H01M 2/22 |
| | | | | 29/623.1 |
| 2015/0318535 | A1* | 11/2015 | Nagamine | H01M 2/26 |
| | | | | 429/178 |

FOREIGN PATENT DOCUMENTS

| | | |
|---|---|---|
| JP | 5137516 B2 | 2/2013 |
| JP | 5876380 B2 | 3/2016 |

* cited by examiner

METHOD OF MANUFACTURING SECONDARY BATTERY

CROSS REFERENCE TO RELATED APPLICATIONS:

The present invention application claims priority to Japanese Patent Application No. 2016-250322 filed in the Japan Patent Office on Dec. 26, 2016, the entire contents of which are incorporated herein by reference.

BACKGROUND OF THE INVENTION

Field of the Invention

The present disclosure relates to a method of manufacturing a secondary battery.

Description of Related Art

Secondary batteries such as nonaqueous electrolyte secondary batteries are used in hybrid electric vehicles, electric vehicles, large power storage systems, and the like.

A nonaqueous electrolyte secondary battery includes an electrode body in which positive electrode plate or plates that include a positive electrode core body having a positive electrode active material mixture layer thereon and negative electrode plate or plates that include a negative electrode core body having a negative electrode active material mixture layer thereon are wound or stacked while having separator interposed in between. Furthermore, a positive electrode collector electrically connected to a positive electrode terminal is connected to positive electrode core body exposed portion, and a negative electrode collector electrically connected to a negative electrode terminal is connected to negative electrode core body exposed portion.

Japanese Patent Application No. 2009-032640 (Patent Document 1) proposes, in a case in which connecting of the core body exposed portion and the collector is performed by resistance welding, providing a protrusion (a projection) on the surface of the collector that opposes the core body exposed portion so that the welding current is concentrated to a position to be welded.

Furthermore, Japanese Patent No. 5876380 (Patent Document 2) proposes of performing resistance welding after the collector is pierced by needle-like members while the core body exposed portion and the collector are layered.

BRIEF SUMMARY OF THE INVENTION

As in Patent Document 1, in a case in which resistance welding is performed after abutting the collector provided with a protrusion in advance against the core body exposed portion, the state of the connection between the protrusion of the collector and the core body exposed portion may not become stable. Accordingly, the size and the shape of the weld nugget formed by resistance welding may not be stable. Alternatively, the amount of metal sputter during resistance welding may increase.

Regarding the technique disclosed in Patent Document 2 described above as well, further improvement to stabilize the size and shape of the weld nugget and to suppress scattering of metal sputter is needed.

A main object of the present disclosure is to provide a method of manufacturing a secondary battery in which a larger weld nugget is formed in a stable manner and in which metal sputtering is suppressed.

An aspect of the present disclosure is a method of manufacturing a secondary battery including an electrode body that includes a positive electrode plate, a layered positive electrode core body exposed portion, a negative electrode plate, and a layered negative electrode core body exposed portion, and a collector that is connected to the layered positive electrode core body exposed portion or the layered negative electrode core body exposed portion by welding, the method including a first step of disposing the collector including a recess on an outer surface of the layered positive electrode core body exposed portion or the layered negative electrode core body exposed portion so that the recess opposes the layered positive electrode core body exposed portion or the layered negative electrode core body exposed portion, a second step of pressing, with a pressing member from a side of a surface opposite to a surface in which the recess is formed, a portion of the collector where the recess is formed, forming a deformed portion by deforming the portion of the collector where the recess is formed, and contacting the deformed portion to the layered positive electrode core body exposed portion or the layered negative electrode core body exposed portion; and a third step of resistance welding the collector and the layered positive electrode core body exposed portion or the layered negative electrode core body exposed portion to each other at the deformed portion by abutting an electrode for resistance welding against the collector.

The manufacturing method described above allows resistance welding to be performed under a state in which the collector and the core body exposed portion are in contact with each other in a stable manner. Furthermore, a portion in which the collector and the core body exposed portion are not in contact with each other can be formed in an area around the contact portion between the collector and the core body exposed portion such that reactive current that is not involved in resistance welding can be reduced. Accordingly, a larger weld nugget can be formed in the portion to be welded in a more stable manner. Furthermore, metal sputtering can be suppressed while resistance welding is carried out.

A method of manufacturing a secondary battery in which a larger weld nugget is formed in a stable manner in a connection between a collector and a core body exposed portion, and in which metal sputtering is suppressed.

DETAILED DESCRIPTION OF THE INVENTION

Figure 1A:
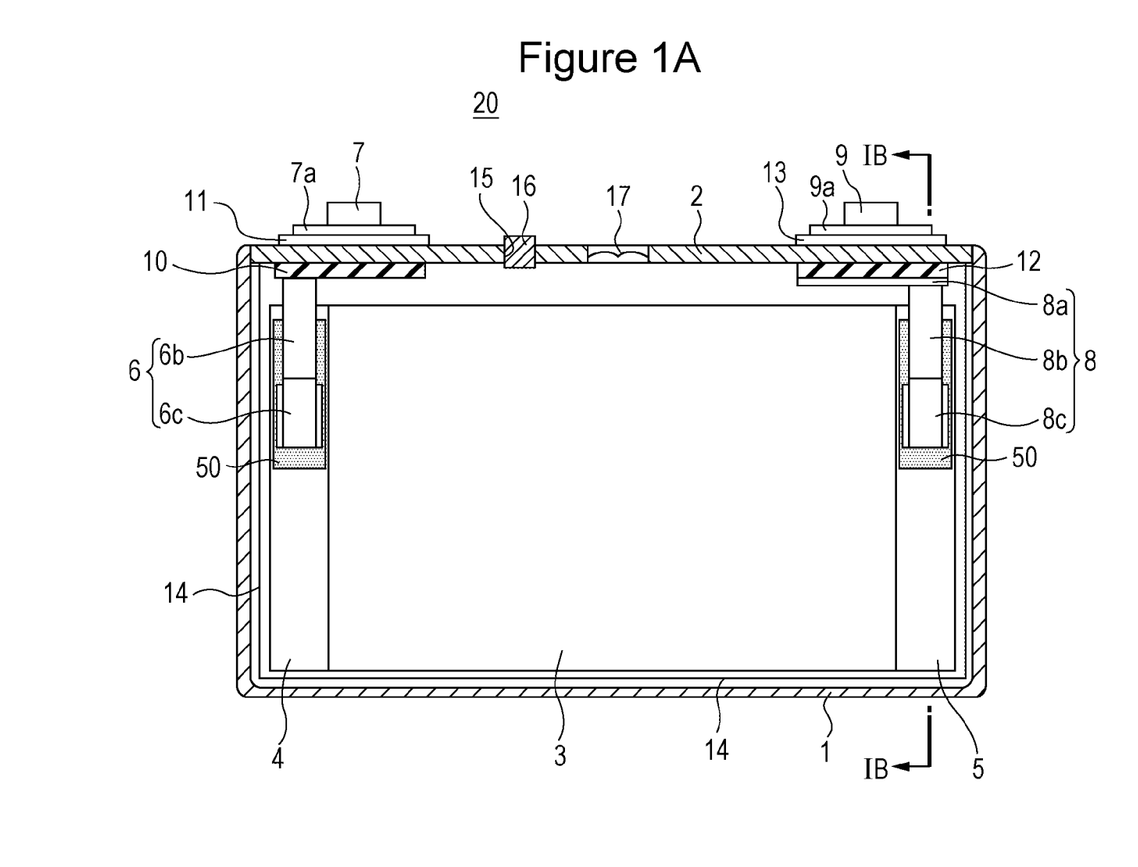
FIG. 1A is a cross-sectional view of a square secondary battery according to an exemplary embodiment.
Figure 1B:
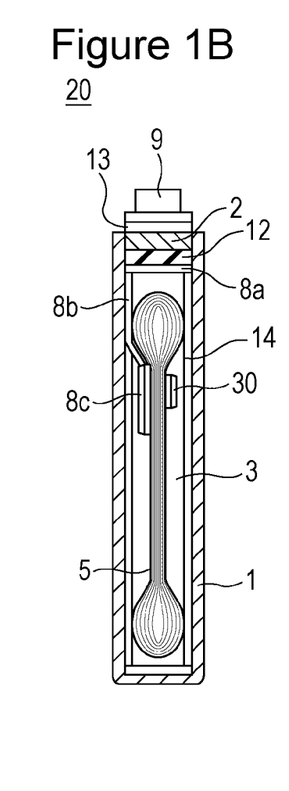
FIG. 1B is a cross-sectional view taken along line IB-IB in FIG. 1A.

Hereinafter, an exemplary embodiment of the present disclosure will be described in detail with reference to the drawings. Note that the present disclosure is not limited to the following modes. Referring first to FIGS. 1A and 1B, a configuration of a square secondary battery 20 according to the exemplary embodiment will be described.

As illustrated in FIGS. 1A and 1B, the square secondary battery 20 includes a square outer package 1 that has an opening on the upper side, and a sealing plate 2 that seals the opening. A battery case is constituted by the square outer package 1 and the sealing plate 2. The square outer package 1 and the sealing plate 2 are made of metal and, desirably, are made of aluminum or an aluminum alloy. A flat wound electrode body 3, in which a positive electrode plate and a negative electrode plate having a separator (each not shown) interposed therebetween are wound, is accommodated inside the square outer package 1 together with nonaqueous electrolyte. The positive electrode plate is a member in which a positive electrode active material mixture layer including a positive electrode active material is formed on a metal positive electrode core body, and a positive electrode core body exposed portion in which the positive electrode core body is exposed is formed in the longitudinal direction of the positive electrode plate. The negative electrode plate is a member in which a negative electrode active material mixture layer including a negative electrode active material is formed on a metal negative electrode core body, and a negative electrode core body exposed portion in which the negative electrode core body is exposed is formed in the longitudinal direction of the negative electrode plate. Note that it is desirable that the positive electrode core body is made of aluminum or an aluminum alloy, and the negative electrode core body is made of copper or a copper alloy.

The wound electrode body 3 includes, on a first edge side thereof in a direction in which a winding axis extends, a positive electrode core body exposed portion 4 in which no positive electrode active material mixture layer is formed and includes, on the second edge side thereof in the direction in which the winding axis extends, a negative electrode core body exposed portion 5 in which no negative electrode active material mixture layer is formed. By being wound, the positive electrode core body exposed portion 4 forms layers of a plurality of positive electrode core body exposed portions 4. Furthermore, by being wound, the negative electrode core body exposed portion 5 forms layers of a plurality of negative electrode core body exposed portions 5. A positive electrode collector 6 is connected to the positive electrode core body exposed portion 4. A positive electrode terminal 7 is connected to the positive electrode collector 6.

A negative electrode collector 8 is connected to the negative electrode core body exposed portion 5. A negative electrode terminal 9 connected to the negative electrode collector 8.

The positive electrode terminal 7 includes a flange portion 7a disposed on a battery outer side of the sealing plate 2, and an insertion portion inserted in a through hole provided in the sealing plate 2. Furthermore, the negative electrode terminal 9 includes a flange portion 9a disposed on the battery outer side of the sealing plate 2, and an insertion portion inserted in a through hole provided in the sealing plate 2.

In the positive electrode core body exposed portion 4, a positive electrode collector receiving component is disposed on the surface on the opposite side with respect to the side on which the positive electrode collector 6 is disposed. Furthermore, in the negative electrode core body exposed portion 5, a negative electrode collector receiving component 30 is disposed on the surface on the opposite side with respect to the side on which the negative electrode collector 8 is disposed. Note that the positive electrode collector receiving component and the negative electrode collector receiving component 30 are not essential components and can be omitted.

The positive electrode collector 6 includes a terminal connection connected to the positive electrode terminal 7, a lead portion 6b extending from the terminal connection towards the wound electrode body 3 side, and a core body connection 6c that is provided on the distal end side of the lead portion 6b and that is connected to the positive electrode core body exposed portion 4. Desirably, the positive electrode collector 6 is made of aluminum or an aluminum alloy. Furthermore, the thickness of the positive electrode collector 6 is desirably about 0.5 to 2 mm.

The negative electrode collector 8 includes a terminal connection 8a connected to the negative electrode terminal 9, a lead portion 8b extending from the terminal connection 8a towards the wound electrode body 3 side, and a core body connection 8c that is provided on the distal end side of the lead portion 8b and that is connected to the negative electrode core body exposed portion 5. The negative electrode collector 8 is desirably made of copper or a copper alloy. Furthermore, the thickness of the negative electrode collector 8 is desirably about 0.5 to 2 mm.

The positive electrode terminal 7 and the positive electrode collector 6 are connected to the sealing plate 2 with an outer side insulating member 11 and an inner side insulating member 10, respectively, in between. The negative electrode terminal 9 and the negative electrode collector 8 are connected to the sealing plate 2 with an outer side insulating member 13 and an inner side insulating member 12, respectively, in between. The inner side insulating member 10 is disposed between the sealing plate 2 and the positive electrode collector 6, and the outer side insulating member 11 is disposed between the sealing plate 2 and the positive electrode terminal 7. The inner side insulating member 12 is disposed between the sealing plate 2 and the negative electrode collector 8, and the outer side insulating member 13 is disposed between the sealing plate 2 and the negative electrode terminal 9. The wound electrode body 3 is accommodated inside the square outer package 1 while covered by an insulation sheet 14. The sealing plate 2 is connected by welding, such as laser welding, to an opening edge portion of the square outer package 1. The sealing plate 2 includes an electrolyte injection hole 15, and the electrolyte injection hole 15 is sealed with a sealing plug 16 after injection of the electrolyte. A gas discharge valve 17 is formed in the sealing plate 2 to discharge gas when the pressure inside the battery becomes equivalent to or higher than a predetermined value. Note that a current breaking mechanism that is activated and that cuts off a conductive path between the positive electrode plate and the positive electrode terminal 7 or a conductive path between the negative electrode plate and the negative electrode terminal 9 when the pressure inside the battery becomes equivalent to or higher than a predetermined value may be provided. When the current breaking mechanism is provided, the operation pressure of the current breaking mechanism is to be lower than the operation pressure of the gas discharge valve 17.

Fabrication of Wound Electrode Body

A method for fabricating the wound electrode body 3 will be described next.

Lithium-nickel-cobalt-manganese composite oxide serving as a positive electrode active material, and a positive electrode mixture including a conductive agent and a binding agent are coated on both surfaces of a rectangular, 15 μm thick aluminum foil serving as a positive electrode core body to form a positive electrode active material mixture layer. Subsequently, a positive electrode plate that includes, at an end portion thereof on one side in the short direction, a positive electrode core body exposed portion that has a predetermined width and that has no positive electrode active material mixture coated thereon is fabricated. Furthermore, a negative electrode mixture, serving as a negative electrode active material, including natural graphite powder and a binding agent is coated on both surfaces of a rectangular, 8 μm thick copper foil serving as a negative electrode core body to form a negative electrode active material mixture layer. Subsequently, a negative electrode plate that includes, at an end portion thereof on one side in the short direction, a negative electrode core body exposed portion that has a predetermined width and that has no negative electrode active material mixture coated thereon is fabricated.

The positive electrode plate and the negative electrode plate are offset with respect to each other such that the positive electrode core body exposed portion of the positive electrode plate and the negative electrode core body exposed portion of the negative electrode plate obtained with the method described above do not overlap with the active material mixture layers of the opposing electrodes. The positive electrode plate and the negative electrode plate are wound while having the porous separator made of polyethylene interposed therebetween, and are formed into a flat shape. With the above, a flat-shaped wound electrode body 3 including a positive electrode core body exposed portion 4 in which a plurality of positive electrode core bodies are layered at one end portion, and a negative electrode core body exposed portion 5 in which a plurality of negative electrode core bodies are layered on the other end portion is obtained.

Assembling Sealing Body

A method of attaching the positive electrode collector 6, the positive electrode terminal 7, the negative electrode collector 8, and the negative electrode terminal 9 to the sealing plate 2 will be described next through the method performed on the negative electrode side as an example. Note that attachment of the positive electrode side can be achieved with a similar method as that of the negative electrode side.

The outer side insulating member 13 is disposed on the battery outer side of the sealing plate 2, and the inner side insulating member 12 and the terminal connection 8a of the negative electrode collector 8 are disposed on the battery inner side of the sealing plate 2. The insertion portion of the negative electrode terminal 9 is inserted into through holes each formed in the outer side insulating member 13, the sealing plate 2, the inner side insulating member 12, and the terminal connection 8a from the battery outer side, and the distal end side of the insertion portion is riveted. With the above, the negative electrode terminal 9, the outer side insulating member 13, the sealing plate 2, the inner side insulating member 12, and the terminal connection 8a are fixed in an integrated manner. Note that the riveted portion of the distal end of the insertion portion of the negative electrode terminal 9 is, desirably, welded to the terminal connection 8a of the negative electrode collector 8.

Attaching Collectors to Electrode Body

A method of attaching the positive electrode collector 6 and the negative electrode collector 8 to the wound electrode body 3 will be described next through an example in which the negative electrode collector 8 is attached to the negative electrode core body exposed portion 5. Note that the positive electrode collector 6 can be attached to the positive electrode core body exposed portion 4 with a method similar to the method in which the negative electrode collector 8 is attached to the negative electrode core body exposed portion 5.

FIGS. 2A to 2D are cross-sectional views of a vicinity of the connection between the negative electrode core body exposed portion 5 and the negative electrode collector 8 taken along a line extending in a direction in which the winding axes of the wound electrode body 3 extends, and illustrate a method in which the negative electrode collector 8 is attached to the negative electrode core body exposed portion 5.

Figure 2A:
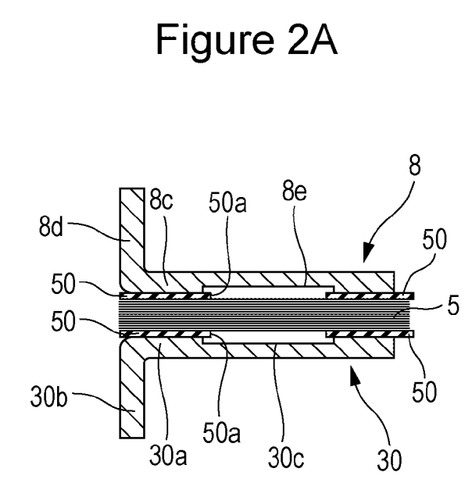
FIGS. 2A to 2D are cross-sectional views of a portion near a connection between a negative electrode core body exposed portion and a negative electrode collector according to the exemplary embodiment taken in a direction in which a winding axis of a wound electrode body extends.

As illustrated in FIG. 2A, first, the core body connection 8c of the negative electrode collector 8 is disposed on a first outer surface side of the layered negative electrode core body exposed portion 5, and the negative electrode collector receiving component 30 is disposed on a second outer surface side. A recess 8e is formed in the core body connection 8c of the negative electrode collector 8. The core body connection 8c of the negative electrode collector 8 is disposed so that the recess 8e opposes the negative electrode core body exposed portion 5. Furthermore, a recess 30c is formed in a body portion 30a of the negative electrode collector receiving component 30. The body portion 30a of the negative electrode collector receiving component 30 is disposed so that the recess 30c opposes the negative electrode core body exposed portion 5. Note that in the core body connection 8c of the negative electrode collector 8, the thickness of the portion where the recess 8e is formed is thinner than the thickness of the portion therearound. Formation of a deformed portion 8f described later is facilitated due to the above configuration. Furthermore, in the body portion 30a of the negative electrode collector receiving component 30, the thickness of the portion where the recess 30c is formed is thinner than the thickness of the portion therearound.

Note that a rib 8d is formed in an end portion of the core body connection 8c of the negative electrode collector 8 on the center side of the wound electrode body 3. Furthermore, a rib 30b is formed in an end portion in the body portion 30a of the negative electrode collector receiving component 30 on the center side of the wound electrode body 3. However, the rib 8d and the rib 30b are not essential components.

As illustrated in FIG. 2A, an insulator film 50 is disposed between the core body connection 8c of the negative electrode collector 8 and the negative electrode core body exposed portion 5. Furthermore, an insulator film 50 is disposed between the body portion 30a of the negative electrode collector receiving component 30 and the negative electrode core body exposed portion 5. An insulator film opening 50*a* is provided in each insulator film 50. The insulator film openings 50*a* of the insulator films 50 are disposed so as to oppose the recess 8*e* of the core body connection 8*c* of the negative electrode collector 8 and the recess 30*c* of the body portion 30*a* of the negative electrode collector receiving component 30.

Desirably, an adhesive layer is provided on the surface of each insulator film 50, and the insulator films 50 are adhered to the negative electrode collector 8 and the negative electrode collector receiving component 30, or to the negative electrode core body exposed portion 5 with the adhesive layers. Note that the insulator film 50 is not an essential component.

Figure 3A:
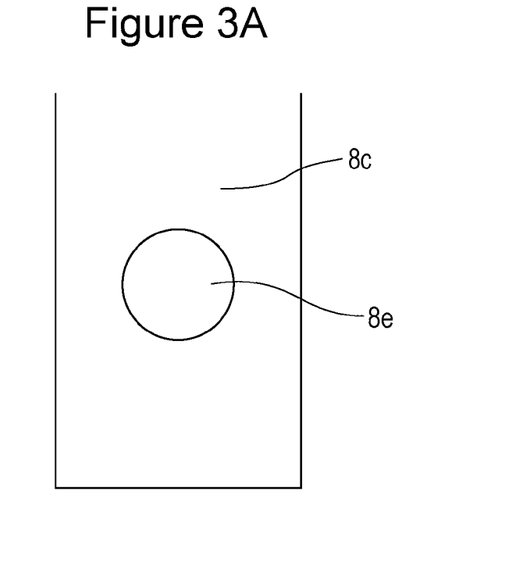
FIGS. 3A and 3B are plan views of a core body connection of the negative electrode collector.
Figure 3B:
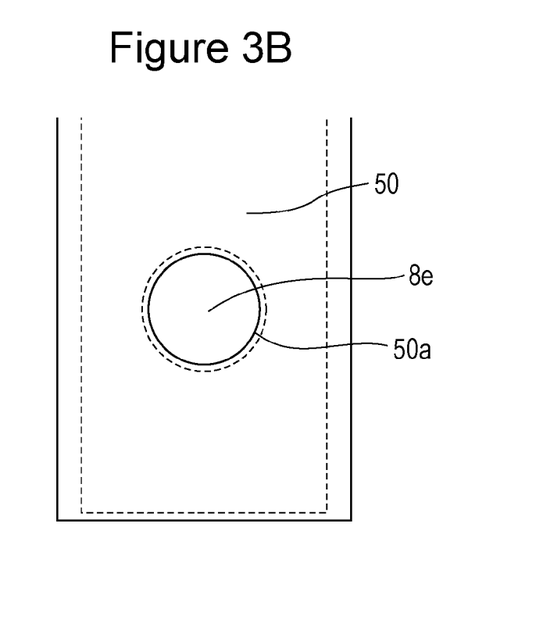

FIG. 3A is a plan view of the core body connection 8*c* of the negative electrode collector 8. The recess 8*e* is provided in a surface of the core body connection 8*c* of the negative electrode collector 8 at a portion opposing the negative electrode core body exposed portion 5. FIG. 3B is a plan view of the core body connection 8*c* on which the insulator film 50 has been adhered. The diameter of the insulator film opening 50*a* provided in the insulator film 50 is, desirably, smaller than the diameter of the recess 8*e*.

Figure 2B:
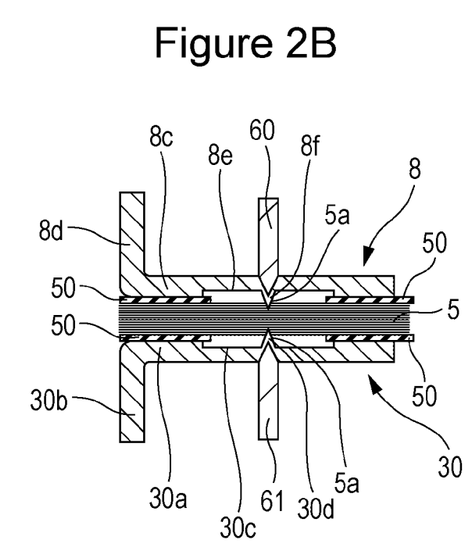

As illustrated in FIG. 2B, a portion in the core body connection 8*c* of the negative electrode collector 8 where the recess 8*e* is formed is pressed with a pressing member 60 from a surface on the opposite side with respect to the surface in which the recess 8*e* is formed. With the above, the portion in the core body connection 8*c* of the negative electrode collector 8 where the recess 8*e* is formed is deformed towards the negative electrode core body exposed portion 5, and the deformed portion 8*f* is formed. The deformed portion 8*f* comes in contact with the negative electrode core body exposed portion 5. Note that compared with the area of the portion in the core body connection 8*c* of the negative electrode collector 8 where the recess 8*e* is formed, the area in the pressing member 60 that presses the negative electrode collector 8 (the distal end of the pressing member 60) is small. With the above, the portion in the core body connection 8*c* of the negative electrode collector 8 where the recess 8*e* is formed partially comes in contact with the negative electrode core body exposed portion 5. Desirably, a member having a pointed-shaped distal end is uses as the pressing member 60. It is desirable that the deformed portion 8*f* in the core body connection 8*c* pierces the negative electrode core body exposed portion 5, and a core opening 5*a* is formed in the negative electrode core body exposed portion 5.

Furthermore, as illustrated in FIG. 2B, the portion in the body portion 30*a* of the negative electrode collector receiving component 30 where the recess 30*c* is formed is pressed with a pressing member 61 from a surface on the opposite side with respect to the surface in which the recess 30*c* is formed. With the above, the portion in the body portion 30*a* of the negative electrode collector receiving component 30 where the recess 30*c* is formed is deformed towards the negative electrode core body exposed portion 5, and a deformed portion 30*d* is formed. The deformed portion 30*d* comes in contact with the negative electrode core body exposed portion 5. Note that compared with the area of the portion in the body portion 30*a* of the negative electrode collector receiving component 30 where the recess 30*c* is formed, the area in the pressing member 61 that presses the negative electrode collector receiving component 30 (the distal end to the pressing member 61) is small. With the above, the portion in the body portion 30*a* of the negative electrode collector receiving component 30 where the recess 30*c* is formed partially comes in contact with the negative electrode core body exposed portion 5. Desirably, a member having a pointed-shaped distal end is uses as the pressing member 61. It is desirable that the deformed portion in the body portion 30*a* of the negative electrode collector receiving component 30 pierces the negative electrode core body exposed portion 5, and the core opening 5*a* is formed in the negative electrode core body exposed portion 5.

An outside diameter of a portion in the deformed portion 8*f* having the largest outside diameter is, desirably, smaller than the diameter of the recess 8*e*. For example, the diameter of the recess 8*e* is preferably about 2 to 10 mm, and the outside diameter of the deformed portion 8*f* is preferably about 1 to 8 mm. Furthermore, the diameter of the recess 8*e* is more preferably about 2 to 5 mm, and the outside diameter of the deformed portion 8*f* is more preferably about 1 to 4 mm.

The pressing of the core body connection 8*c* of the negative electrode collector 8 with the pressing member 60, and the pressing of the body portion 30*a* of the negative electrode collector receiving component 30 with the pressing member 61 can be performed at the same time or either one can be performed first.

Figure 2C:
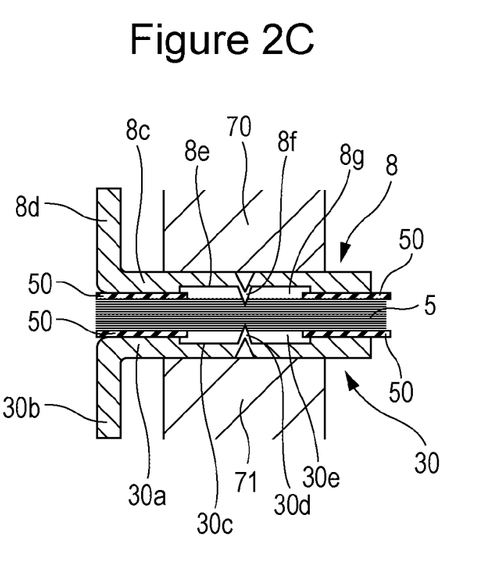

Subsequently, as illustrated in FIG. 2C, in the core body connection 8*c* of the negative electrode collector 8, an electrode 70 for resistance welding is abutted against the surface on the opposite side with respect to the recess 8*e*, and in the body portion 30*a* of the negative electrode collector receiving component 30, the electrode 71 for resistance welding is abutted against the surface on the opposite side with respect to the recess 30*c*. Subsequently, a voltage is applied across the electrode 70 for resistance welding and the electrode 71 for resistance welding so that an electric current for resistance welding is applied while the electrode 70 for resistance welding and the electrode 71 for resistance welding interpose the core body connection 8*c* of the negative electrode collector 8, the negative electrode core body exposed portion 5, and the body portion 30*a* of the negative electrode collector receiving component 30 therebetween.

Figure 2D:
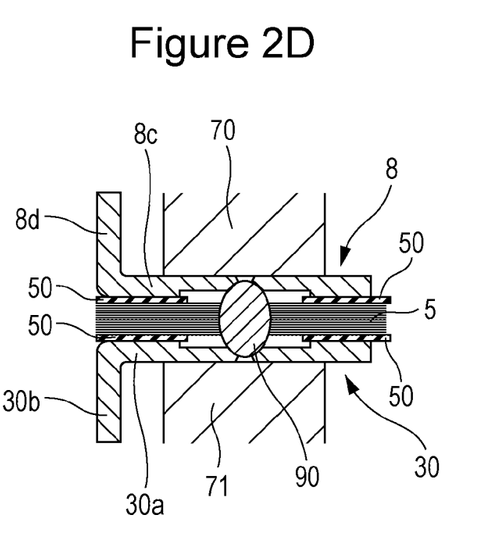

With the above, a weld nugget 90 is formed as illustrated in FIG. 2D.

In the method described above, after the core body connection 8*c* of the negative electrode collector 8 is disposed on the outer surface side of the negative electrode core body exposed portion 5, the pressing member 60 presses the portion in the core body connection 8*c* where the recess 8*e* is formed, and the deformed portion 8*f* of the core body connection 8*c* is made to come in contact with the negative electrode core body exposed portion 5. Accordingly, the state in which the deformed portion 8*f* of the core body connection 8*c* and the negative electrode core body exposed portion 5 are in contact with each becomes more stable. Furthermore, since resistance welding is carried out in the above state, a larger weld nugget is formed in a further stable manner. Furthermore, metal sputtering can be suppressed while resistance welding is carried out.

Furthermore, as illustrated in FIG. 2C, in the above method, resistance welding is performed while there is a gap 8*g* in the area around the deformed portion 8*f* of the core body connection 8*c* of the negative electrode collector 8. With the above, direct contact between the core body connection 8*c* of the negative electrode collector 8 and the negative electrode core body exposed portion 5 can be prevented from occurring in the area around the deformed portion 8*f*. Accordingly, since the electric current for resistance welding concentrates in the contact portion between the deformed portion 8f and the negative electrode core body exposed portion 5, a larger weld nugget is formed in a further stable manner. Furthermore, metal sputtering can be suppressed further while resistance welding is carried out. Furthermore, in a case in which metal sputtering occurs during resistance welding, the metal sputter solidifies in the recess 8e, such that scattering of the metal sputter to the outside of the recess 8e can be prevented. Note that a lager weld nugget 90 may be formed by resistance welding so that the gap 8g is eliminated.

Furthermore, in the method described above, in the core body connection 8c of the negative electrode collector 8, the insulator film 50 is disposed between the area around the recess 8e and the negative electrode core body exposed portion 5. Accordingly, the electric current for resistance welding can be prevented from flowing in the core body connection 8c between the area around the recess 8e and the negative electrode core body exposed portion 5. Accordingly, a larger weld nugget is formed in a further stable manner. Furthermore, metal sputtering can be suppressed further while resistance welding is carried out. Note that the insulator films 50 can be omitted.

Furthermore, the method described above is further effective since the negative electrode collector receiving component 30 side is configured in a similar manner to the configuration on the negative electrode collector 8 side. The deformed portion 30d is formed on the negative electrode collector receiving component 30 side as well, and resistance welding is carried out while there is a gap 30e.

Figure 4A:
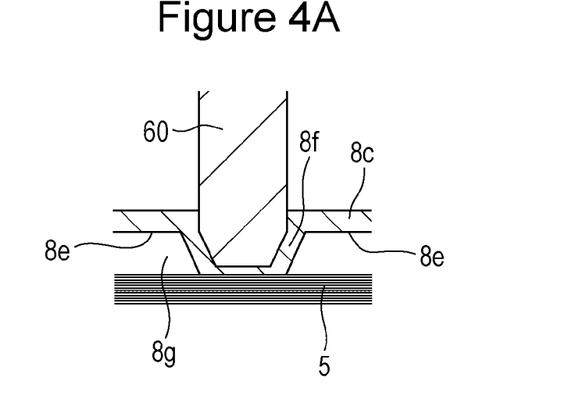
FIGS. 4A to 4C are diagrams illustrating a state in which the negative electrode collector is pressed with a pressing member.
Figure 4B:
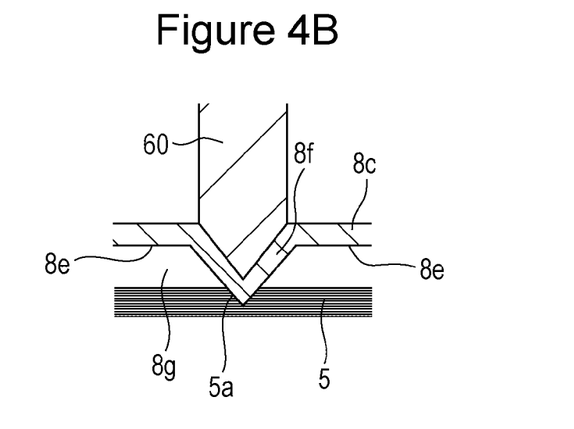
Figure 4C:
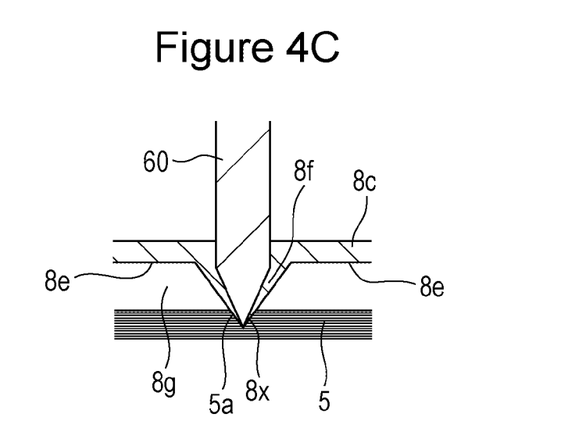

FIGS. 4A to 4C are diagrams illustrating states in which the portion in the core body connection 8c of the negative electrode collector 8 where the recess 8e is formed is pressed with a pressing member 60 from a surface on the opposite side with respect to the surface in which the recess 8e is formed. Shapes of the distal end portion of the pressing member 60 are different in the FIGS. 4A to 4C.

As illustrated in FIG. 4A, the distal end of the pressing member 60 may be flat. However, as illustrated in FIG. 4B, desirably, the pressing member 60 with a pointed distal end is used so that the deformed portion 8f of the negative electrode collector 8 bites into the negative electrode core body exposed portion 5. The state in which the deformed portion 8f of the negative electrode collector 8 and the negative electrode core body exposed portion 5 are in contact with each other becomes more satisfactory with the above configuration. With the above, a larger weld nugget is formed in a further stable manner. Furthermore, metal sputtering can be suppressed further while resistance welding is carried out. Note that more desirably, the deformed portion 8f of the negative electrode collector 8 bites into the negative electrode core body exposed portion 5 and the core opening 5a is formed in the negative electrode core body exposed portion 5. Furthermore, as illustrated in FIG. 4C, desirably, a member with a pointed distal end is used as the pressing member 60, so that a collector opening 8x is formed in the deformed portion 8f of the negative electrode collector 8. The state in which the deformed portion 8f of the negative electrode collector 8 and the negative electrode core body exposed portion 5 are in contact with each other becomes more satisfactory with the above configuration. With the above, a larger weld nugget is formed in a further stable manner. Furthermore, metal sputtering can be suppressed further while resistance welding is carried out. Note that desirably, the deformed portion 8f of the negative electrode collector 8 bites into the negative electrode core body exposed portion 5. Furthermore, desirably, the core opening 5a is formed in the negative electrode core body exposed portion 5. In the mode illustrated in FIG. 4C, the distal end of the pressing member 60 bites directly into the negative electrode core body exposed portion 5.

First Modification

FIGS. 5A to 5D are cross-sectional views of a vicinity of the connection between the negative electrode core body exposed portion 5 and the negative electrode collector 8 according to a first modification taken along a line extending in a direction in which the winding axes of the wound electrode body 3 extends, and illustrate a method in which the negative electrode collector 8 is attached to the negative electrode core body exposed portion 5.

The first modification is similar to the exemplary embodiment described above except for the shape of the negative electrode collector receiving component, and the method of connecting the negative electrode collector receiving component and the negative electrode core body exposed portion.

Figure 5A:
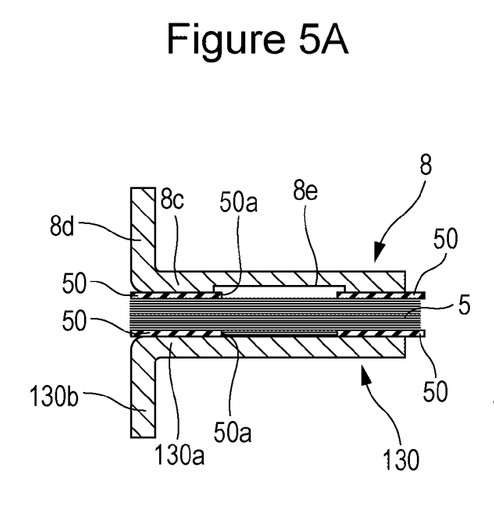
FIGS. 5A to 5D are cross-sectional views of the portion near the connection between the negative electrode core body exposed portion and the negative electrode collector according to a first modification taken in the direction in which the winding axis of the wound electrode body extends.

In the first modification, a negative electrode collector receiving component 130 includes a body portion 130a, and a rib 130b formed in the end portion of the body portion 130a on the center side of the wound electrode body 3. The recess 30c provided in the negative electrode collector receiving component 30 according to the exemplary embodiment described above is not formed in the negative electrode collector receiving component 130.

As illustrated in FIG. 5A, the core body connection 8c of the negative electrode collector 8 is disposed on a first outer surface side of the layered negative electrode core body exposed portion 5, and the negative electrode collector receiving component 130 is disposed on a second outer surface side. The recess 8e is formed in the core body connection 8c of the negative electrode collector 8. The core body connection 8c of the negative electrode collector 8 is disposed so that the recess 8e opposes the negative electrode core body exposed portion 5.

Note that as illustrated in FIG. 5A, the insulator film 50 is disposed between the core body connection 8c of the negative electrode collector 8 and the negative electrode core body exposed portion 5. Furthermore, the insulator film 50 is disposed between the body portion 130a of the negative electrode collector receiving component 130 and the negative electrode core body exposed portion 5. The insulator film opening 50a is provided in each insulator film 50. The insulator film openings 50a of the insulator films 50 are disposed at a position opposing the portions in the core body connection 8c of the negative electrode collector 8 and the negative electrode core body exposed portion 5 that are to be welded, and at a position opposing the portions in the body portion 130a of the negative electrode collector receiving component 130 and the negative electrode core body exposed portion 5 that are to be welded. In other words, the weld nugget 90 is formed through the insulator film openings 50a of the insulator films 50.

Figure 5B:
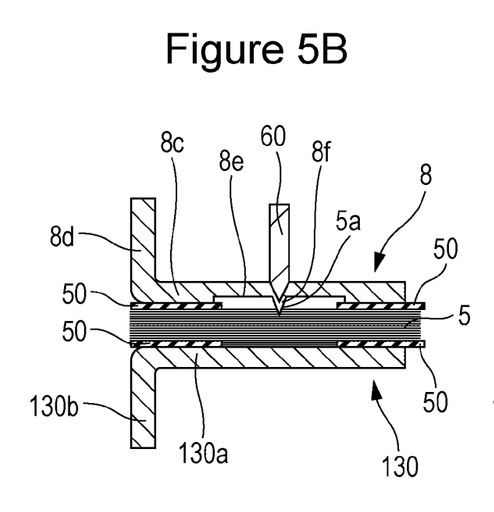

As illustrated in FIG. 5B, a portion in the core body connection 8c of the negative electrode collector 8 where the recess 8e is formed is pressed with the pressing member 60 from the surface on the opposite side with respect to the surface in which the recess 8e is formed. With the above, the portion in the core body connection 8c of the negative electrode collector 8 where the recess 8e is formed is deformed towards the negative electrode core body exposed portion 5, and the deformed portion 8f is formed. The deformed portion 8f comes in contact with the negative electrode core body exposed portion 5. Note that it is desirable that the deformed portion 8f in the core body connection 8c pierces the negative electrode core body exposed portion 5, and the core opening 5a is formed in the negative electrode core body exposed portion 5.

Figure 5C:
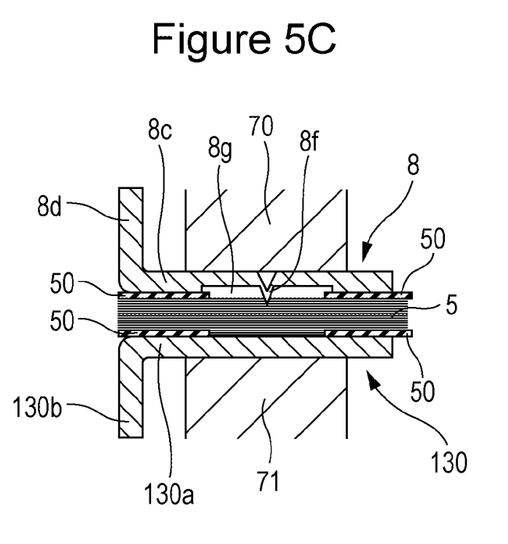

Subsequently, as illustrated in FIG. 5C, in the core body connection 8c of the negative electrode collector 8, the electrode 70 for resistance welding is abutted against the surface on the opposite side with respect to the recess 8e. Furthermore, the electrode 71 for resistance welding is abutted against the outer surface of the body portion 130a of the negative electrode collector receiving component 130. Subsequently, a voltage is applied across the electrode 70 for resistance welding and the electrode 71 for resistance welding so that an electric current for resistance welding is applied while the electrode 70 for resistance welding and the electrode 71 for resistance welding interpose the core body connection 8c of the negative electrode collector 8, the negative electrode core body exposed portion 5, and the body portion 130a of the negative electrode collector receiving component 130 therebetween.

Figure 5D:
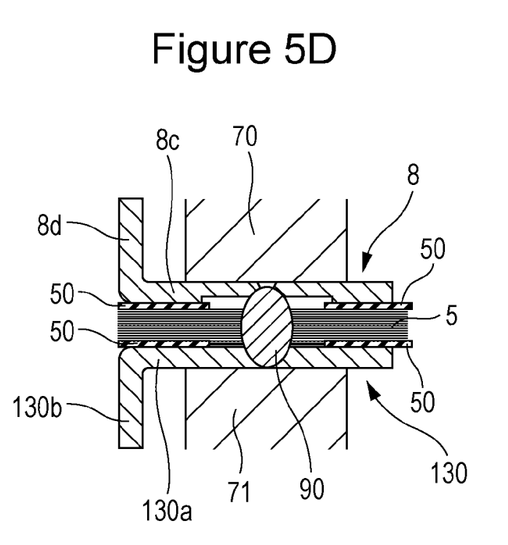

With the above, the weld nugget 90 is formed as illustrated in FIG. 5D.

A larger weld nugget 90 is formed in a further stable manner with the above method. Furthermore, metal sputtering can be suppressed while resistance welding is carried out.

Second Modification

FIGS. 6A to 6D are cross-sectional views of a vicinity of the connection between the negative electrode core body exposed portion 5 and the negative electrode collector 8 according to a second modification taken along a line extending in a direction in which the winding axes of the wound electrode body 3 extends, and illustrate a method in which the negative electrode collector 8 is attached to the negative electrode core body exposed portion 5. The second modification is similar to the exemplary embodiment described above except for the shape of the negative electrode collector receiving component, and the method of connecting the negative electrode collector receiving component and the negative electrode core body exposed portion.

Figure 6A:
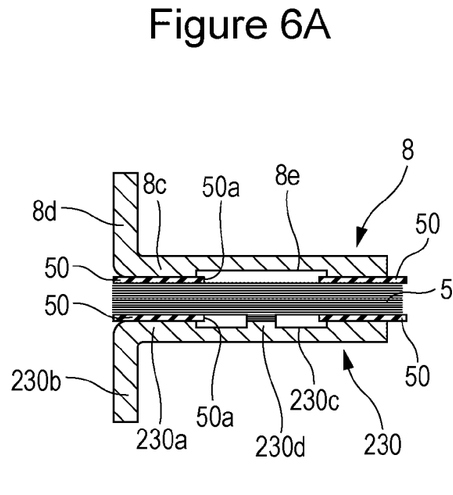
FIGS. 6A to 6D are cross-sectional views of the portion near the connection between the negative electrode core body exposed portion and the negative electrode collector according to a second modification taken in the direction in which the winding axis of the wound electrode body extends.
Figure 7:
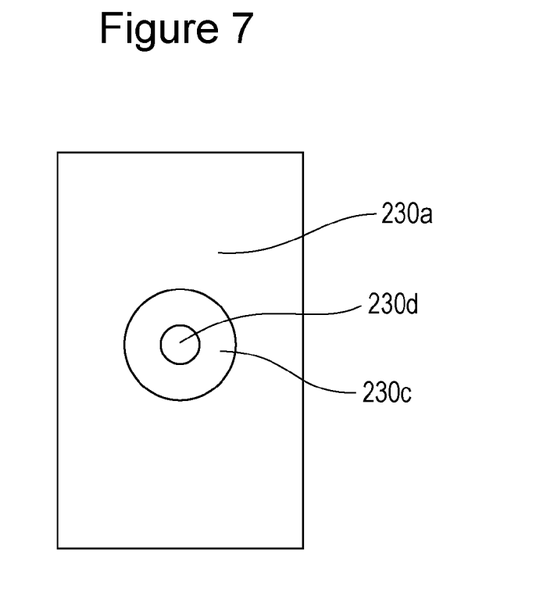
FIG. 7 is a plan view of a negative electrode collector receiving component according to the second modification.

As illustrated in FIGS. 6A and 7, in the second modification, a negative electrode collector receiving component 230 includes a body portion 230a, and a rib 230b formed in the end portion of the body portion 230a on the center side of the wound electrode body 3. A recess 230c is formed in the body portion 230a of the negative electrode collector receiving component 230, and a protrusion 230d is formed at the center of the recess 230c.

As illustrated in FIG. 6A, the core body connection 8c of the negative electrode collector 8 is disposed on the first outer surface side of the layered negative electrode core body exposed portion 5, and the negative electrode collector receiving component 230 is disposed on the second outer surface side. The recess 8e is formed in the core body connection 8c of the negative electrode collector 8. The core body connection 8c of the negative electrode collector 8 is disposed so that the recess 8e opposes the negative electrode core body exposed portion 5. Furthermore, the body portion 230a of the negative electrode collector receiving component 230 is disposed so that the surface in which the recess 230c is formed opposes the negative electrode core body exposed portion 5.

Note that as illustrated in FIG. 6A, the insulator film 50 is disposed between the core body connection 8c of the negative electrode collector 8 and the negative electrode core body exposed portion 5. Furthermore, the insulator film 50 is disposed between the body portion 230a of the negative electrode collector receiving component 230 and the negative electrode core body exposed portion 5. An insulator film opening 50a is provided in each insulator film 50. The insulator film openings 50a of the insulator films 50 are disposed at a position opposing the portions in the core body connection 8c of the negative electrode collector 8 and the negative electrode core body exposed portion 5 that are to be welded, and at a position opposing the portions in the body portion 230a of the negative electrode collector receiving component 230 and the negative electrode core body exposed portion 5 that are to be welded. In other words, the weld nugget 90 is formed through the insulator film openings 50a of the insulator films 50.

Figure 6B:
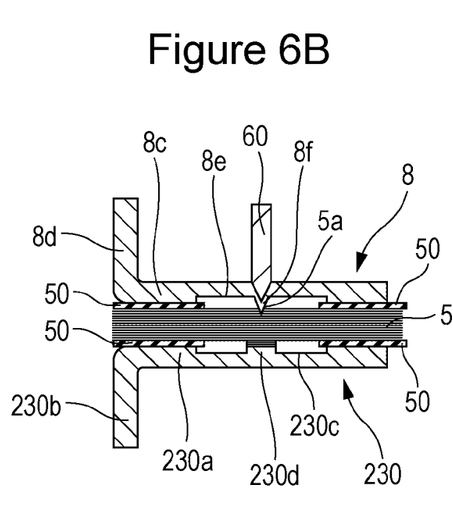

As illustrated in FIG. 6B, a portion in the core body connection 8c of the negative electrode collector 8 where the recess 8e is formed is pressed with a pressing member 60 from a surface on the opposite side with respect to the surface in which the recess 8e is formed. With the above, the portion in the core body connection 8c of the negative electrode collector 8 where the recess 8e is formed is deformed towards the negative electrode core body exposed portion 5, and the deformed portion 8f comes in contact with the negative electrode core body exposed portion 5. Note that it is desirable that the deformed portion 8f in the core body connection 8c pierces the negative electrode core body exposed portion 5, and a core opening 5a is formed in the negative electrode core body exposed portion 5. Note that it is desirable that the deformed portion 8f is formed at a position that opposes the protrusion 230d of the negative electrode collector receiving component 230 with the negative electrode core body exposed portion 5 interposed therebetween.

Figure 6C:
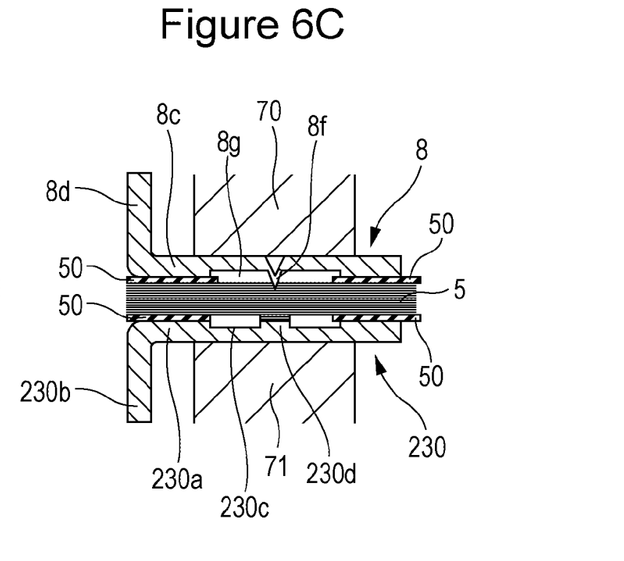

Subsequently, as illustrated in FIG. 6C, in the core body connection 8c of the negative electrode collector 8, the electrode 70 for resistance welding is abutted against the surface on the opposite side with respect to the recess 8e. Furthermore, the electrode 71 for resistance welding is abutted against the outer surface of the body portion 230a of the negative electrode collector receiving component 230. Subsequently, a voltage is applied across the electrode 70 for resistance welding and the electrode 71 for resistance welding so that an electric current for resistance welding is applied while the electrode 70 for resistance welding and the electrode 71 for resistance welding interpose the core body connection 8c of the negative electrode collector 8, the negative electrode core body exposed portion 5, and the body portion 230a of the negative electrode collector receiving component 230 therebetween.

Figure 6D:
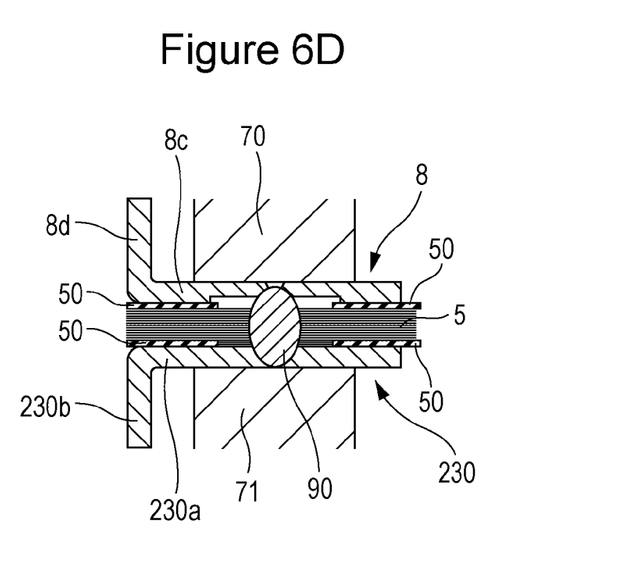

With the above, a weld nugget 90 is formed as illustrated in FIG. 6D.

A larger weld nugget 90 is formed in a further stable manner with the above method. Furthermore, metal sputtering can be suppressed while resistance welding is carried out.

Furthermore, in the above method, the negative electrode collector receiving component 230 and the negative electrode core body exposed portion 5 are resistance welded to each other at the protrusion 230d formed at the middle of the recess 230c of the negative electrode collector receiving component 230. Accordingly, the electric current for resistance welding can be reliably concentrated to the portion to be welded during resistance welding. Accordingly, a larger weld nugget 90 is formed in a further stable manner. Furthermore, metal sputtering can be suppressed further while resistance welding is carried out.

Third Modification

FIGS. 8A to 8D are cross-sectional views of a vicinity of the connection between the negative electrode core body exposed portion 5 and the negative electrode collector 8 according to a third modification taken along a line extending in a direction in which the winding axes of the wound electrode body 3 extends, and illustrate a method in which the negative electrode collector 180 is attached to the negative electrode core body exposed portion 5. The third modification similar to the exemplary embodiment described above except for the shape of the core body connection of the negative electrode collector, and that the negative electrode collector receiving component and the insulator films 50 are not used.

Figure 8A:
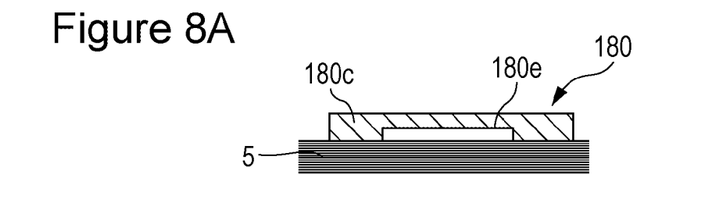
FIGS. 8A to 8D are cross-sectional views of the portion near the connection between the negative electrode core body exposed portion and the negative electrode collector according to a third modification taken in the direction in which the winding axis of the wound electrode body extends.

As illustrated in FIG. 8A, in the third modification, a recess 180e is provided in a core body connection 180c of the negative electrode collector 180. Note that no ribs are formed in the core body connection 180c.

As illustrated in FIG. 8A, the core body connection 180c of the negative electrode collector 180 is disposed on a first outer surface side of the layered negative electrode core body exposed portion 5 so that the surface in which the recess 180e is formed opposes the negative electrode core body exposed portion 5.

Figure 8B:
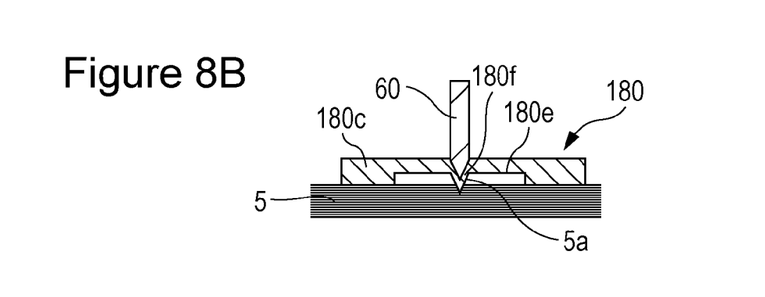

Subsequently, as illustrated in FIG. 8B, a portion in the core body connection 180c of the negative electrode collector 180 where the recess 180e is formed is pressed with the pressing member 60 from a surface on the opposite side with respect to the surface in which the recess 180e is formed. With the above, the portion in the core body connection 180c of the negative electrode collector 180 where the recess 180e is formed is deformed towards the negative electrode core body exposed portion 5, and a deformed portion 180f is formed. The deformed portion 180f comes in contact with the negative electrode core body exposed portion 5. Note that it is desirable that the deformed portion 180f in the core body connection 180c pierces the negative electrode core body exposed portion 5, and the core opening 5a is formed in the negative electrode core body exposed portion 5.

Figure 8C:
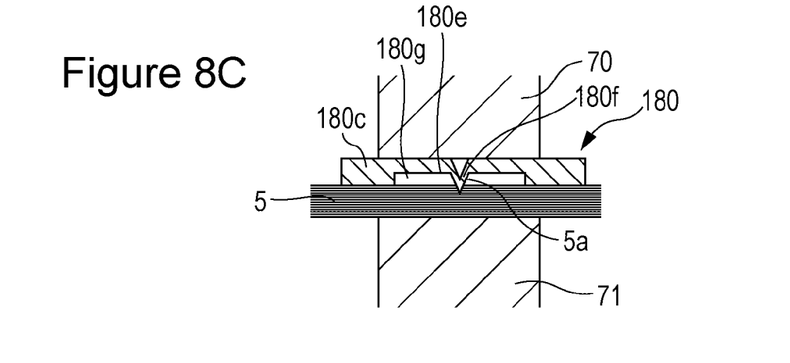

Subsequently, as illustrated in FIG. 8C, in the core body connection 180c of the negative electrode collector 180, the electrode 70 for resistance welding is abutted against the surface on the opposite side with respect to the recess 180e. Furthermore, the electrode 71 for resistance welding is abutted against the outer surface of the layered negative electrode core body exposed portion 5 that is on the opposite side with respect to the surface on which the core body connection 180c of the negative electrode collector 180 is disposed. Subsequently, a voltage is applied across the electrode 70 for resistance welding and the electrode 71 for resistance welding so that an electric current for resistance welding is applied while the electrode 70 for resistance welding and the electrode 71 for resistance welding interpose the core body connection 180c of the negative electrode collector 180 and the negative electrode core body exposed portion 5 therebetween. Note that before resistance welding is carried out, a gap 180g is formed between the core body connection 180c of the negative electrode collector 180 and the negative electrode core body exposed portion 5 in a portion around the deformed portion 180f.

Figure 8D:
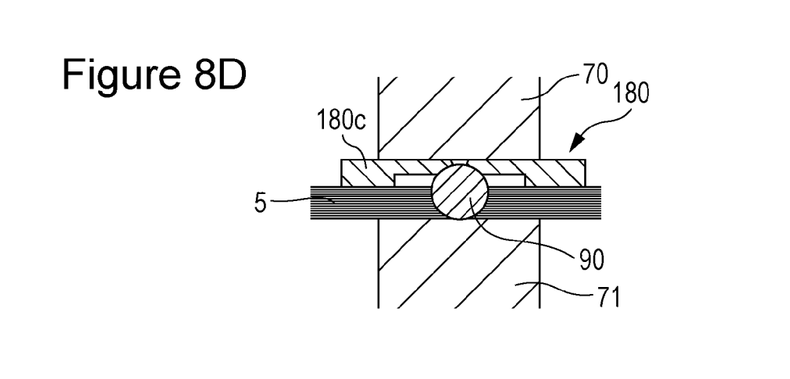

With the above, the weld nugget 90 is formed as illustrated in FIG. 8D.

A larger weld nugget 90 is formed in a further stable manner with the above method. Furthermore, metal sputtering can be suppressed while resistance welding is carried out.

Others

The negative electrode side has been described in the exemplary embodiment and the modifications described above as an example; however, the above can be applied to the positive electrode side as well. In other words, it is only sufficient that the present disclosure is applied to at least either one of the positive electrode side or the negative electrode side.

An example using the wound electrode body has been described in the exemplary embodiment and the modifications described above; however, the above can be applied to a stacked electrode body including a plurality of positive electrode plates and a plurality of negative electrode plates.

In a case in which a collector including a recess is disposed on an outer surface side of the stacked positive electrode core body exposed portion or the stacked negative electrode core body exposed portion so that the recess opposes the positive electrode core body exposed portion or the negative electrode core body exposed portion, the collector may be directly disposed on the stacked positive electrode core body exposed portion or the stacked negative electrode core body exposed portion. Furthermore, the collector may be disposed on the stacked positive electrode core body exposed portion or the stacked negative electrode core body exposed portion with an insulator film or the like interposed therebetween. However, it is desirable that the recessed portion of the collector where the deformed portion is formed directly opposes the stacked positive electrode core body exposed portion or the stacked negative electrode core body exposed portion.

Desirably, the insulator film is formed of polypropylene, polyimide, polyphenylene sulfide, polyethylene, polyester, or polyethylenenaphthalate. Furthermore, desirably, the adhesive layer provided on the surface of the insulator film is formed of a rubber adhesive, an acrylic adhesive, or a polyethylene adhesive.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method of manufacturing a secondary battery including an electrode body that includes a positive electrode plate, a layered positive electrode core body exposed portion, a negative electrode plate, and a layered negative electrode core body exposed portion, and a collector that is connected to the layered positive electrode core body exposed portion or the layered negative electrode core body exposed portion by welding, the method comprising:

a first step of disposing the collector including a recess on an outer surface of the layered positive electrode core body exposed portion or the layered negative electrode core body exposed portion so that the recess opposes the layered positive electrode core body exposed portion or the layered negative electrode core body exposed portion;

a second step of pressing, with a pressing member from a side of a surface opposite to a surface in which the recess is formed, a portion of the collector where the recess is formed, forming a deformed portion by deforming the portion of the collector where the recess is formed, and contacting the deformed portion to the layered positive electrode core body exposed portion or the layered negative electrode core body exposed portion; and a third step of resistance welding the collector and the layered positive electrode core body exposed portion or the layered negative electrode core body exposed portion to each other at the deformed portion by abutting an electrode for resistance welding against the collector.

2. The method of manufacturing a secondary battery according to claim 1,
wherein in the second step, a distal end of the deformed portion is made to bite into the layered positive electrode core body exposed portion or the layered negative electrode core body exposed portion.

3. The method of manufacturing a secondary battery according to claim 1,
wherein in the second step, a member having a pointed distal end is used as the pressing member so that an opening is formed in the deformed portion and so that the distal end of the deformed portion is in contact with the layered positive electrode core body exposed portion or the layered negative electrode core body exposed portion.

4. The method of manufacturing a secondary battery according to claim 3,
wherein in the second step, the distal end of the pressing member pierces the layered positive electrode core body exposed portion or the layered negative electrode core body exposed portion.

5. The method of manufacturing a secondary battery according to claim 1,
wherein a collector receiving component is connected to an outer surface of the layered positive electrode core body exposed portion or the layered negative electrode core body exposed portion, the outer surface being an outer surface opposite to the outer surface on which the collector is disposed.

6. The method of manufacturing a secondary battery according to claim 5, further comprising:
a step of disposing the collector receiving component, which includes a second recess, on the outer surface of the layered positive electrode core body exposed portion or the layered negative electrode core body exposed portion that is on the opposite side with respect to the outer surface on which the collector is disposed, the collector receiving component being disposed so that the second recess opposes the layered positive electrode core body exposed portion or the layered negative electrode core body exposed portion; and a step of pressing, with a pressing member from a side of a surface opposite to a surface in which the second recess is formed, a portion of the collector receiving component where the second recess is formed, deforming the collector receiving component, and contacting a deformed portion to the layered positive electrode core body exposed portion or the layered negative electrode core body exposed portion, wherein in the third step, electrodes for resistance welding are each abutted against the collector and the collector receiving component, and the collector receiving component and the layered positive electrode core body exposed portion or the layered negative electrode core body exposed portion are resistance welded to each other at the deformed portion of the collector receiving component.

7. The method of manufacturing a secondary battery according to claim 5, further comprising:
a step of disposing the collector receiving component, the collector receiving component including a second recess and provided with a protrusion at a middle of the second recess, on the outer surface of the layered positive electrode core body exposed portion or the layered negative electrode core body exposed portion that is on the opposite side with respect to the outer surface on which the collector is disposed so that the protrusion opposes the layered positive electrode core body exposed portion or the layered negative electrode core body exposed portion, wherein in the third step, abutting the electrodes for resistance welding each against the collector and the collector receiving component, and resistance welding the collector receiving component and the layered positive electrode core body exposed portion or the layered negative electrode core body exposed portion to each other at the protrusion of the collector receiving component.

* * * * *